(12) United States Patent
Park et al.

(10) Patent No.: US 12,084,112 B2
(45) Date of Patent: Sep. 10, 2024

(54) DASH PANEL STRUCTURE FOR VEHICLE

(71) Applicants: Hyundai Motor Company, Seoul (KR); Kia Corporation, Seoul (KR)

(72) Inventors: Ki Bong Park, Incheon (KR); Seung Min Kang, Hwaseong-si (KR)

(73) Assignees: KIA CORPORATION, Seoul (KR); HYUNDAI MOTOR COMPANY, Seoul (KR)

( * ) Notice: Subject to any disclaimer, the term of this patent is extended or adjusted under 35 U.S.C. 154(b) by 478 days.

(21) Appl. No.: 17/493,134

(22) Filed: Oct. 4, 2021

(65) Prior Publication Data

US 2022/0169312 A1 Jun. 2, 2022

(30) Foreign Application Priority Data

Dec. 2, 2020 (KR) .......................... 10-2020-0166387

(51) Int. Cl.
*B60K 1/04* (2019.01)
*B62D 21/15* (2006.01)
*B62D 25/14* (2006.01)
*B62D 65/02* (2006.01)

(52) U.S. Cl.
CPC .............. *B62D 21/152* (2013.01); *B60K 1/04* (2013.01); *B62D 25/145* (2013.01); *B62D 65/024* (2013.01); *B60K 2001/0438* (2013.01)

(58) Field of Classification Search
CPC .. B62D 21/152; B62D 25/145; B62D 65/024; B60K 2001/0438; B60K 1/04
See application file for complete search history.

(56) References Cited

U.S. PATENT DOCUMENTS 11,376,948 B2 * 7/2022 Tomita ................ B60R 13/0846
2020/0353995 A1 * 11/2020 Alwan ................... B62D 25/04

* cited by examiner

*Primary Examiner* — Jason D Shanske
*Assistant Examiner* — James J Triggs
(74) *Attorney, Agent, or Firm* — SLATER MATSIL, LLP (57) ABSTRACT

An embodiment dash panel structure for a vehicle includes a battery assembly located under a floor of the vehicle, a front subframe located in front of the battery assembly, a dash panel located behind the front subframe and connected to a front of the floor, and a first reinforcing member mounted on a lower portion of the dash panel facing the front subframe.

19 Claims, 8 Drawing Sheets

FIG.8

DASH PANEL STRUCTURE FOR VEHICLE

CROSS-REFERENCE TO RELATED APPLICATIONS

This application claims the benefit of Korean Patent Application No. 10-2020-0166387, filed in the Korean Intellectual Property Office on Dec. 2, 2020, which application is hereby incorporated herein by reference.

TECHNICAL FIELD

The present disclosure relates to a dash panel structure for a vehicle.

BACKGROUND

In recent years, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

An electric vehicle includes an electric motor and a battery assembly which is disposed under a floor of the vehicle. The electric motor is configured to drive front wheels of the vehicle, and the battery assembly is configured to supply electricity to the electric motor and other electric/electronic components. The battery assembly includes one or more battery cells (or battery modules), electric/electronic components associated with the battery cells, a battery case in which the battery cells and the electric/electronic components are mounted, and a cover with which the top of the battery case is covered.

In the battery assembly of the electric vehicle, leakage of a coolant from a cooling line due to external impacts or interference between the battery cells may cause a fire. In order to safely protect the battery assembly even in the event of a vehicle impact/collision, the battery protection law (regulations) has been established. An internal combustion engine vehicle only considers the absorption of impact energy, while the electric vehicle must consider not only the absorption of impact energy, but also the protection of the battery assembly according to the battery protection law.

The vehicle includes a front compartment and a passenger compartment which are divided by a dash panel. A powertrain including a prime mover such as the internal combustion engine or the electric motor is disposed in the front compartment. For example, the internal combustion engine vehicle has the powertrain including the internal combustion engine disposed in the front compartment, and the electric vehicle has the powertrain including the electric motor disposed in the front compartment.

The front compartment is defined by a vehicle front structure, and the vehicle front structure includes a front end module, a pair of front side members connected to the front end module, a pair of fender apron members connected to the front end module, a pair of damper housings connected to the pair of front side members, a front subframe disposed under the pair of front side members, and a dash panel.

The electric motor is mounted on the front subframe, and the front subframe is separated during a vehicle impact/collision, and accordingly the front subframe and the electric motor may hit a lower portion of the dash panel. As the dash panel is bent, there may not be enough impact safety space between the front subframe and the battery assembly, resulting in a failure to safely protect the battery assembly, and causing direct injury to passengers in the passenger compartment. In order to protect a front end portion of the battery assembly safely, a plurality of structural members may be mounted, which significantly increase the weight of a vehicle body, resulting in a reduced all electric range (AER).

The above information described in this background section is provided to assist in understanding the background of the inventive concept, and may include any technical concept which is not considered as the prior art that is already known to those skilled in the art.

SUMMARY

The present disclosure relates to a dash panel structure for a vehicle. Particular embodiments relate to a dash panel structure for a vehicle preventing a dash panel from being deformed or bent by impact energy in the event of a vehicle impact/collision, thereby safely protecting a battery assembly disposed under a floor.

Embodiments of the present disclosure can solve problems occurring in the prior art while advantages achieved by the prior art are maintained intact.

An embodiment of the present disclosure provides a dash panel structure for a vehicle improving stiffness of a dash panel to prevent the dash panel from being deformed or bent as a front subframe hits the dash panel during a vehicle impact/collision, thereby safely protecting a battery assembly disposed under a floor.

According to an embodiment of the present disclosure, a dash panel structure for a vehicle may include a battery assembly located under a floor of the vehicle, a front subframe located in front of the battery assembly, a dash panel located behind the front subframe and connected to the front of the floor, and a first reinforcing member mounted on a lower portion of the dash panel facing the front subframe.

The first reinforcing member may include a first transverse extension portion extending in a width direction of the dash panel, and a plurality of longitudinal extension portions extending from the first transverse extension portion toward the floor.

The plurality of longitudinal extension portions may include a center extension portion extending from the center of the first transverse extension portion in a longitudinal direction of the vehicle, a pair of inner extension portions symmetrically disposed on both sides of the center extension portion, and a pair of outer extension portions spaced apart from the pair of inner extension portions toward the exterior of the vehicle, respectively.

The floor may have a tunnel extending along a center line thereof, and a pair of floor members symmetrically disposed on both sides of the tunnel. A pair of side sills may be mounted on both side edges of the floor, respectively. A rear end of each inner extension portion may be attached to a front end of each floor member, and a rear end of each outer extension portion may be attached to a front end of each side sill.

The dash panel may include a vertical portion, an inclined portion obliquely extending from the vertical portion toward the bottom of the vehicle, a horizontal portion extending from a rear end of the inclined portion toward the floor, an upper connection portion connecting a bottom end of the vertical portion and a top end of the inclined portion, and a lower connection portion connecting a bottom end of the inclined portion and a front end of the horizontal portion.

The first transverse extension portion may be attached to the upper connection portion, and the plurality of longitudinal extension portions may be attached to the horizontal portion.

The dash panel structure may further include a second reinforcing member attached to a top surface of the first reinforcing member.

The second reinforcing member may include a second transverse extension portion extending in the width direction of the dash panel, and a pair of side extension portions extending from both end portions of the second transverse extension portion, respectively.

The second transverse extension portion may be attached to the first transverse extension portion, and the second transverse extension portion and the first transverse extension portion may define a closed transverse cross-section.

A pair of front pillars may be attached to both side edges of the dash panel, respectively, and a rear end of each side extension portion may be attached to the corresponding front pillar.

The dash panel structure may further include a pair of third reinforcing members attached to a top surface of the lower connection portion.

Each third reinforcing member may connect each inner extension portion and the center extension portion.

The third reinforcing member and the lower connection portion may define a cavity.

A front portion of the battery assembly may be connected to the lower connection portion located below the third reinforcing member through a mounting bolt.

A nut may be positioned in the cavity, and as the mounting bolt is screwed into the nut, the front portion of the battery assembly may be connected to the lower connection portion.

A pipe nut may be positioned in the cavity, and as the mounting bolt is screwed into the pipe nut, the front portion of the battery assembly may be connected to the lower connection portion.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
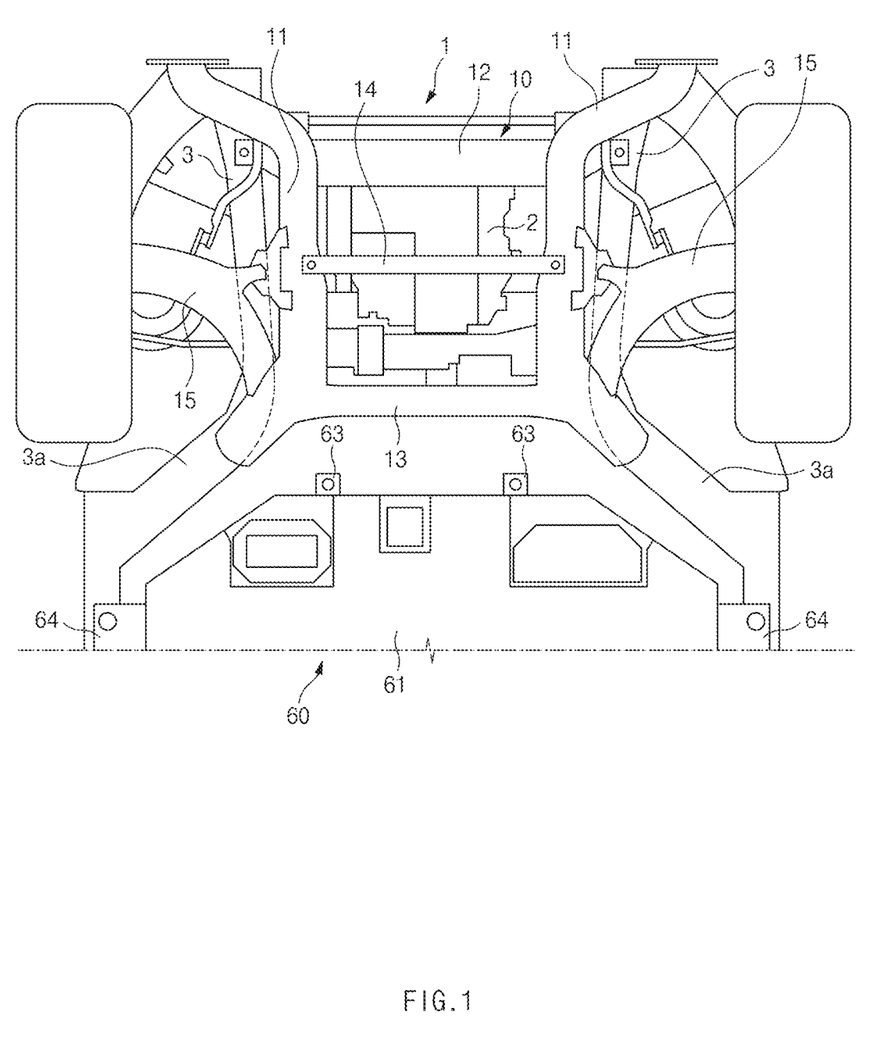
FIG. 1 illustrates a bottom view of a vehicle front structure according to an exemplary embodiment of the present disclosure.

Referring to FIG. 1, a vehicle front structure 1 according to an exemplary embodiment of the present disclosure may include a pair of front side members 3, and a front subframe 10 disposed under the pair of front side members 3.

The pair of front side members 3 may be spaced apart from each other in a transverse direction of the vehicle, and each front side member 3 may extend in a longitudinal direction of the vehicle. Each front side member 3 may have a rear extension portion 3a obliquely extending from the rear thereof toward the exterior of the vehicle, and the rear extension portion 3a may be attached to the bottom of a dash panel (or firewall) 20. A grille (not shown) may be disposed on a front end of the vehicle, and a front end module (not shown) may be disposed right behind the grille. The pair of front side members 3 may be connected to the front end module.

The front subframe 10 may be disposed under the pair of front side members 3. The front subframe 10 may include a pair of longitudinal members 11, a front crossmember 12 connecting front portions of the pair of longitudinal members 11, and a rear crossmember 13 connecting rear portions of the pair of longitudinal members 11. Each longitudinal member 11 may extend in the longitudinal direction of the vehicle. The longitudinal members 11 may be disposed under the corresponding front side members 3. The front crossmember 12 and the rear crossmember 13 may extend in the transverse direction of the vehicle. A pair of lower control arms 15 may be connected to the pair of longitudinal members 11, respectively. A front end of each lower control arm 15 may be mounted on a central portion of the longitudinal member 11 through a mounting bracket and/or the like, and a rear end of each lower control arm 15 may be mounted on the rear portion of the longitudinal member 11. A middle cross bar 14 may be disposed between the front crossmember 12 and the rear crossmember 13. The middle cross bar 14 may extend in the transverse direction of the vehicle, and the middle cross bar 14 may connect the central portions of the pair of longitudinal members 11.

According to an exemplary embodiment, the front subframe 10 may have a pair of front mounting portions (not shown) located on a front portion of the front subframe 10, a pair of central mounting portions (not shown) located on a central portion of the front subframe 10, and a pair of rear mounting portions (not shown) located on a rear portion of the front subframe 10. The front subframe 10 may be mounted on the pair of front side members 3 and/or relevant components through the pair of front mounting portions, the pair of central mounting portions, and the pair of rear mounting portions.

At least some components of a powertrain may be mounted on the front subframe 10. The powertrain of an internal combustion engine vehicle may include an internal combustion engine, and the powertrain of an electric vehicle may include an electric motor 2 and various electric/electronic components. The powertrain of the electric vehicle may also be referred to as a power electronics system.

Figure 4:
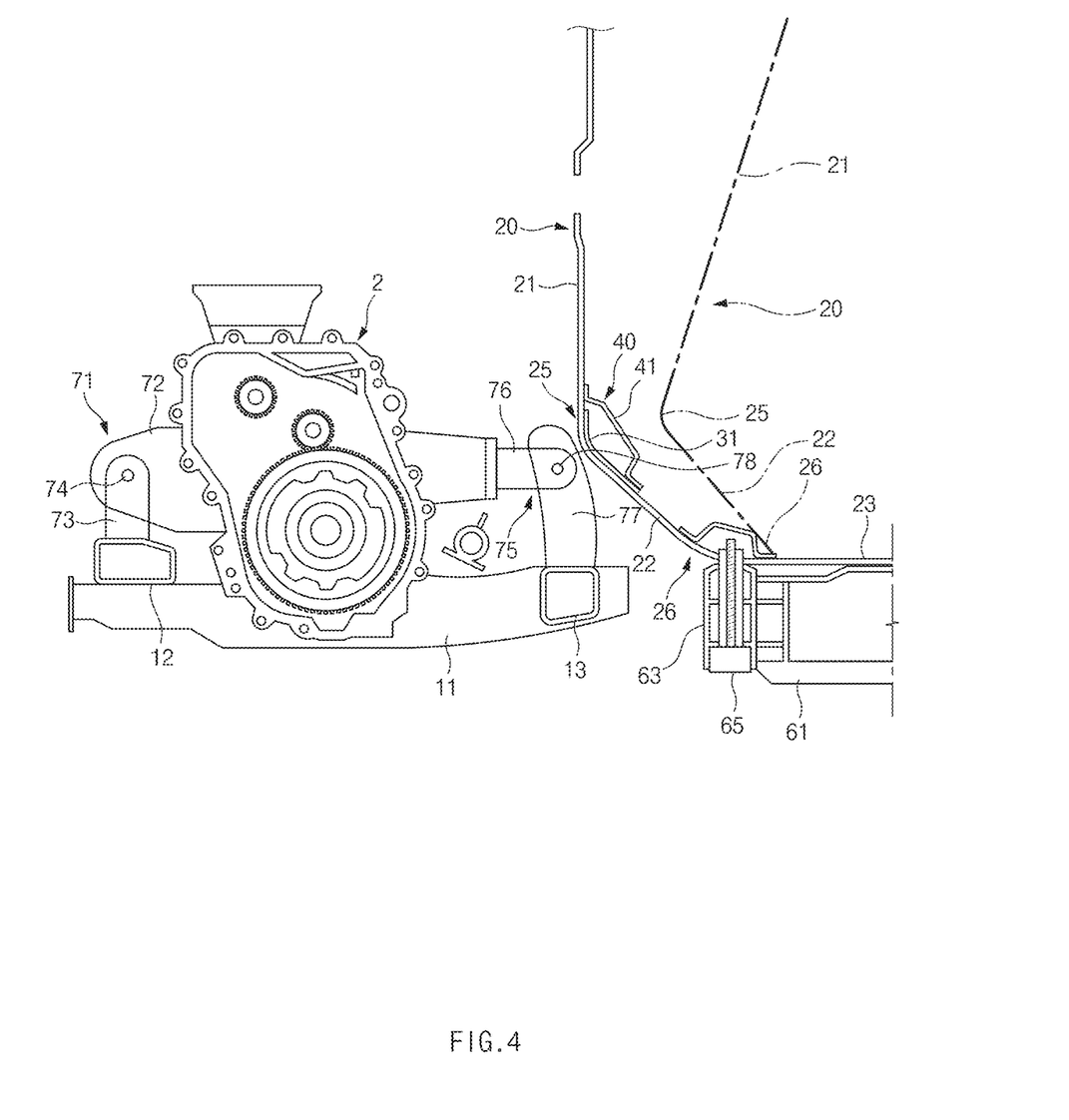
FIG. 4 illustrates a cross-sectional view, taken along line A-A of FIG. 2.

Referring to FIG. 4, a front edge of the electric motor 2 may be pivotally connected to the front crossmember 12 of the front subframe 10 through a front connection portion 71. The front connection portion 71 may include a front pivot arm 72 protruding from the front edge of the electric motor 2 toward the front crossmember 12 of the front subframe 10, a front pivot lug 73 protruding upwardly from the front crossmember 12 of the front subframe 10, and a front pivot pin 74 extending through the front pivot arm 72 and the front pivot lug 73. The front pivot arm 72 and/or the front pivot lug 73 may pivot around the front pivot pin 74.

Referring to FIG. 4, a rear edge of the electric motor 2 may be pivotally connected to the rear crossmember 13 of the front subframe 10 through a rear connection portion 75. The rear connection portion 75 may include a rear pivot arm 76 protruding from the rear edge of the electric motor 2 toward the rear of the vehicle, a rear pivot lug 77 protruding upwardly from the rear crossmember 13 of the front subframe 10, and a rear pivot pin 78 extending through the rear pivot arm 76 and the rear pivot lug 77. The rear pivot arm 76 and/or the rear pivot lug 77 may pivot around the rear pivot pin 78.

A battery assembly 60 may supply electric energy to the electric motor of the powertrain and various electric/electronic components. The battery assembly 60 may be disposed under a floor 5 of the vehicle and a horizontal portion 23 of the dash panel 20. The battery assembly 60 may include a battery case 61 in which a plurality of battery cells and relevant electric/electronic components are received, a plurality of front mounts 63 provided on a front edge of the battery case 61, a pair of side mounts 64 provided on both side edges of the battery case 61, and a plurality of rear mounts (not shown) provided on a rear edge of the battery case 61. The plurality of front mounts 63, the pair of side mounts 64, and the plurality of rear mounts (not shown) may be formed as a unitary, one piece construction with the battery case 61.

The battery assembly 60 may be located behind the front subframe 10, and the rear crossmember 13 of the front subframe 10 may be adjacent to the battery assembly 60. Since the front subframe 10 is located in front of the battery assembly 60 and the dash panel 20, the front subframe 10 may hit a lower portion of the dash panel 20 and the battery assembly 60 during a vehicle impact/collision.

Figure 2:
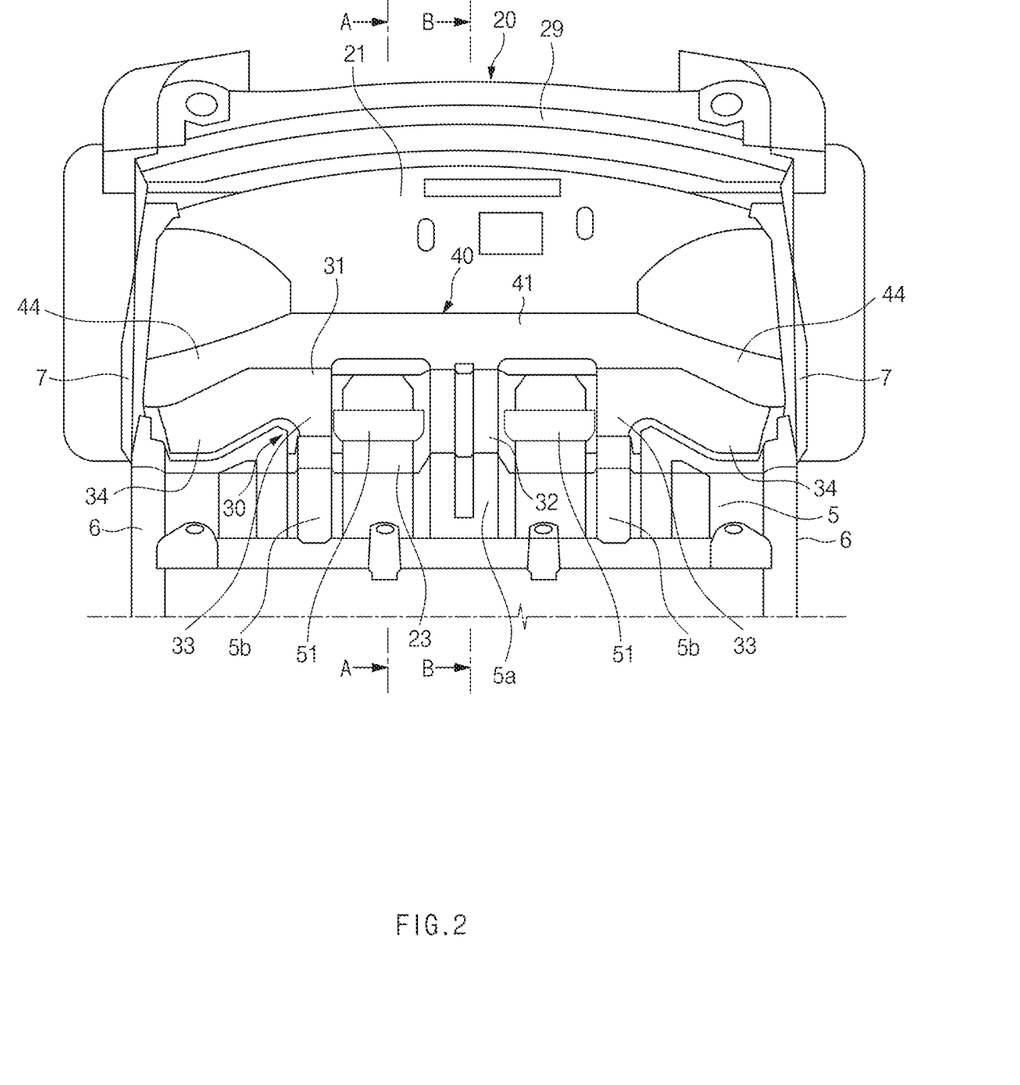
FIG. 2 illustrates a plan view of a dash panel structure for a vehicle according to an exemplary embodiment of the present disclosure.
Figure 3:
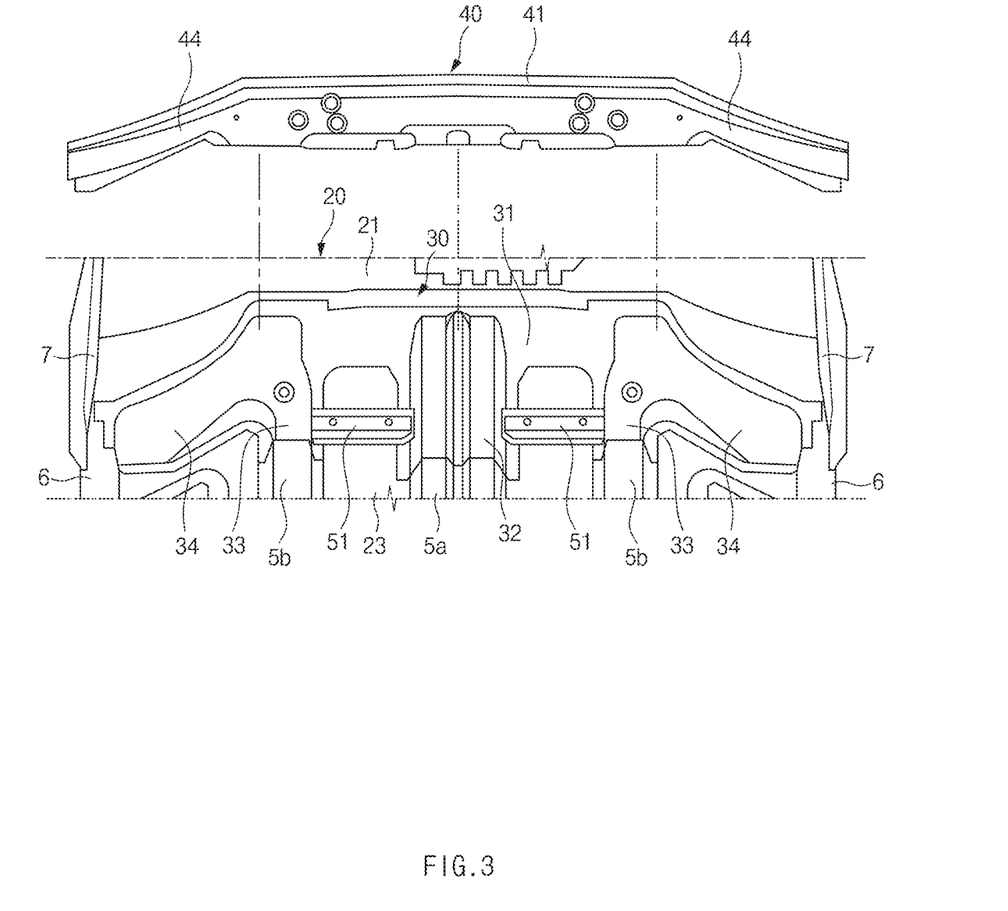
FIG. 3 illustrates a state in which a second reinforcing member is separated from the dash panel structure illustrated in FIG. 2.

Referring to FIGS. 2 to 4, the dash panel 20 may be connected to a front end of the floor 5, and the dash panel 20 may be located behind the front subframe 10. The dash panel 20 may have a width extending along the transverse direction of the vehicle, a height extending along a height direction of the vehicle, and a length extending along the longitudinal direction of the vehicle. The dash panel 20 may divide a front compartment from a passenger compartment. The vehicle front structure may include the front compartment divided by the dash panel 20, and a cowl 29 may be mounted on a top end of the dash panel 20. The front compartment may be defined by the dash panel 20, the front end module, a pair of fender apron support members, and the pair of front side members 3. A pair of front pillars 7 may be mounted on both side edges of the dash panel 20, respectively.

The floor 5 may have a tunnel 5*a* extending along a center line, and a pair of floor members 5*b* symmetrically disposed on both sides of the tunnel 5*a*. The tunnel 5*a* and the pair of floor members 5*b* may extend in the longitudinal direction of the vehicle. A pair of side sills 6 may be mounted on both side edges of the floor 5, respectively.

Referring to FIG. 4, the dash panel 20 may include a vertical portion 21 extending vertically in the height direction of the vehicle, an inclined portion 22 obliquely extending from a bottom end of the vertical portion 21 toward the bottom of the vehicle, the horizontal portion 23 extending horizontally from a rear end of the inclined portion 22 toward the floor 5, an upper connection portion 25 connecting the bottom end of the vertical portion 21 and a top end of the inclined portion 22, and a lower connection portion 26 connecting a bottom end of the inclined portion 22 and a front end of the horizontal portion 23. The upper connection portion 25 may be curved between the bottom end of the vertical portion 21 and the top end of the inclined portion 22, and the lower connection portion 26 may be curved between the bottom end of the inclined portion 22 and the front end of the horizontal portion 23.

When the front subframe 10 and the electric motor 2 hit the lower portion of the dash panel 20 during a frontal collision of the vehicle, the dash panel 20 may be bent toward the rear of the vehicle with respect to the upper connection portion 25 and the lower connection portion 26 (see a dashed dotted line in FIG. 4). As the dash panel 20 is bent toward the rear of the vehicle, there may not be enough safety distance between the front subframe 10 and the battery assembly 60, so it may be difficult to protect the battery assembly 60 and passengers in the passenger compartment safely. According to an exemplary embodiment of the present disclosure, a plurality of reinforcing members 30, 40, and 51 may be mounted on the dash panel 20, thereby preventing the dash panel 20 from being bent with respect to the upper connection portion 25 and the lower connection portion 26 in the event of a vehicle impact/collision, and thus protecting the battery assembly 60 and the passengers in the passenger compartment safely.

The plurality of reinforcing members 30, 40, and 51 may be mounted on the lower portion of the dash panel 20 adjacent to the front subframe 10. According to an exemplary embodiment, the plurality of reinforcing members 30, 40, and 51 may be directly mounted on the lower portion of the dash panel 20 facing the front subframe 10, thereby increasing stiffness of the lower portion of the dash panel 20 adjacent to the front subframe 10. Specifically, the plurality of reinforcing members 30, 40, and 51 may be mounted on the inclined portion 22 of the dash panel 20 adjacent to the rear crossmember 13 of the front subframe 10. Even when the electric motor 2 and the front subframe 10 directly hit the inclined portion 22 of the dash panel 20 during the vehicle impact/collision, the plurality of reinforcing members 30, 40, and 51 may prevent the dash panel 20 from being bent with respect to the upper connection portion 25 and the lower connection portion 26.

According to a specific exemplary embodiment, a first reinforcing member 30 may be attached to the inclined portion 22 by welding, using fasteners, and/or the like. The first reinforcing member 30 may include a first transverse extension portion 31 extending in a width direction of the dash panel 20, and a plurality of longitudinal extension portions 32, 33, and 34 each extending from the first transverse extension portion 31 in the longitudinal direction of the vehicle.

The first transverse extension portion 31 may be directly attached to a top surface of the upper connection portion 25 by welding, using fasteners, and/or the like.

The plurality of longitudinal extension portions 32, 33, and 34 may include a center extension portion 32, a pair of inner extension portions 33 disposed symmetrically with respect to the center extension portion 32, and a pair of outer extension portions 34 spaced apart from the pair of inner extension portions 33 toward the exterior of the vehicle, respectively. The plurality of longitudinal extension portions 32, 33, and 34 may extend along the horizontal portion 23 of the dash panel 20, so the plurality of longitudinal extension portions 32, 33, and 34 may be attached to a top surface of the horizontal portion 23 of the dash panel 20.

Figure 8:
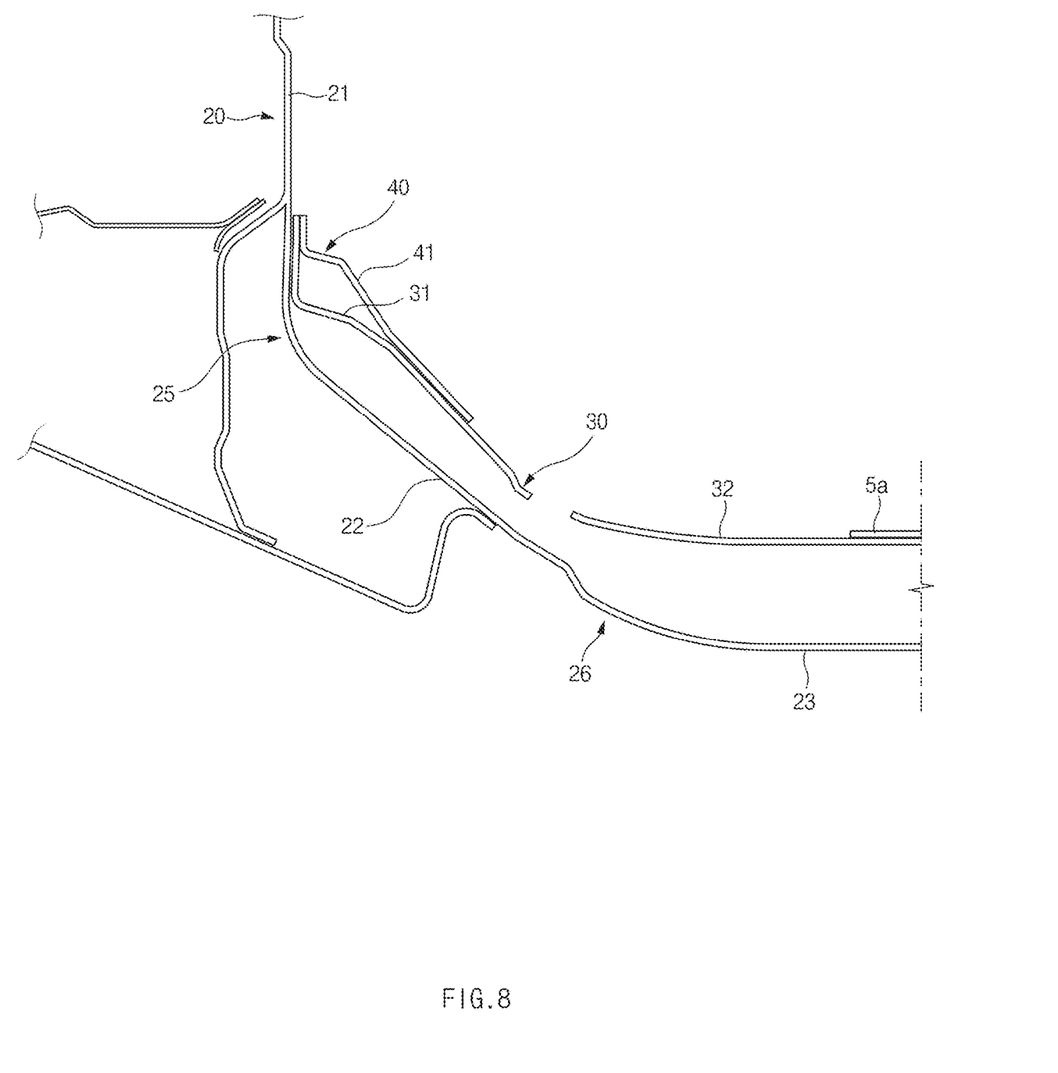
FIG. 8 illustrates a cross-sectional view, taken along line B-B of FIG. 2.

The center extension portion 32 may extend from the center of the first transverse extension portion 31 in the longitudinal direction of the vehicle. Referring to FIGS. 3 and 8, the center extension portion 32 may extend from the center of the first transverse extension portion 31 toward the floor 5. A rear end of the center extension portion 32 may be directly attached to the tunnel 5a of the floor 5 by welding, using fasteners, and/or the like.

The pair of inner extension portions 33 may extend from the first transverse extension portion 31 in the longitudinal direction of the vehicle. The pair of inner extension portions 33 may be symmetrically disposed on both sides of the center extension portion 32, and a rear end of each inner extension portion 33 may be attached to a front end of the corresponding floor member 5b by welding, using fasteners, and/or the like. Each inner extension portion 33 may be closer to the center extension portion 32 than the corresponding outer extension portion 34. That is, each inner extension portion 33 may be disposed between the center extension portion 32 and the corresponding outer extension portion 34. Each inner extension portion 33 may be spaced apart from the center extension portion 32 in the transverse direction of the vehicle.

The pair of outer extension portions 34 may extend from both end portions of the first transverse extension portion 31, respectively. Each outer extension portion 34 may extend diagonally from each end portion of the first transverse extension portion 31 toward a front end of the corresponding side sill 6. A rear end of each outer extension portion 34 may be attached to the front end of the corresponding side sill 6 by welding, using fasteners, and/or the like. Each outer extension portion 34 may be spaced apart from the corresponding inner extension portion 33 in the transverse direction of the vehicle.

According to an exemplary embodiment, the plurality of longitudinal extension portions 32, 33, and 34 may be integrally formed with the first transverse extension portion 31 by pressing, casting, and/or the like, so that the plurality of longitudinal extension portions 32, 33, and 34 and the first transverse extension portion 31 may form a unitary one-piece structure.

According to another exemplary embodiment, the plurality of longitudinal extension portions 32, 33, and 34 may be formed separately from the first transverse extension portion 31, and the plurality of longitudinal extension portions 32, 33, and 34 and the first transverse extension portion 31 may be joined by using fasteners, welding, and/or the like.

As the first transverse extension portion 31 of the first reinforcing member 30 is attached to the upper connection portion 25, the first transverse extension portion 31 of the first reinforcing member 30 may increase transverse stiffness with respect to the upper connection portion 25. In addition, as the longitudinal extension portions 32, 33, and 34 of the first reinforcing member 30 are attached to the horizontal portion 23 of the dash panel 20, the longitudinal extension portions 32, 33, and 34 of the first reinforcing member 30 may increase longitudinal stiffness with respect to the upper connection portion 25 and the horizontal portion 23 of the dash panel 20. Accordingly, the first reinforcing member 30 may define a load path in the width direction and longitudinal direction of the vehicle, thereby preventing the dash panel 20 from being deformed or bent when the front subframe 10 and the electric motor 2 hit the lower portion of the dash panel 20 during the vehicle impact/collision.

According to an exemplary embodiment of the present disclosure, a second reinforcing member 40 may be provided to further increase stiffness with respect to the upper connection portion 25 of the dash panel 20. The second reinforcing member 40 may be attached to a top surface of the first transverse extension portion 31 of the first reinforcing member 30 by welding, using fasteners, and/or the like. The second reinforcing member 40 may extend in the transverse direction of the vehicle. The second reinforcing member 40 may extend on the upper connection portion 25 of the dash panel 20 along the transverse direction of the vehicle.

The second reinforcing member 40 may include a second transverse extension portion 41 extending in the width direction of the dash panel 20 and a pair of side extension portions 44 extending from both end portions of the second transverse extension portion 41, respectively.

The second transverse extension portion 41 may have an inverted U-shaped cross section, and the second transverse extension portion 41 may be attached to the first transverse extension portion 31 of the first reinforcing member 30 by welding, using fasteners, and/or the like. As illustrated in FIG. 4, the second transverse extension portion 41 and the first transverse extension portion 31 may define a closed transverse cross-section, and a cavity may be defined by the second transverse extension portion 41 and the first transverse extension portion 31. As the second transverse extension portion 41 of the second reinforcing member 40 and the first transverse extension portion 31 of the first reinforcing member 30 define the cavity, the stiffness of the upper connection portion 25 of the dash panel 20 may be significantly improved, and a load path may be defined by the second transverse extension portion 41 and the pair of side extension portions 44 in the transverse direction of the vehicle.

Each side extension portion 44 may extend diagonally from each end portion of the second transverse extension portion 41 toward the corresponding front pillar 7. A rear end of each side extension portion 44 may be attached to the corresponding front pillar 7 by welding, using fasteners, and/or the like.

According to an exemplary embodiment of the present disclosure, a plurality of third reinforcing members 51 may be provided to further increase stiffness of the lower connection portion 26 of the dash panel 20. According to a specific exemplary embodiment, the pair of third reinforcing members 51 may be attached to a top surface of the lower connection portion 26 of the dash panel 20 by welding, using fasteners, and/or the like. Each third reinforcing member 51 may extend in the transverse direction of the vehicle, and the third reinforcing member 51 may be attached to the top surface of the lower connection portion 26 by welding, using fasteners, and/or the like to connect the inner extension portion 33 and the center extension portion 32.

Figure 5:
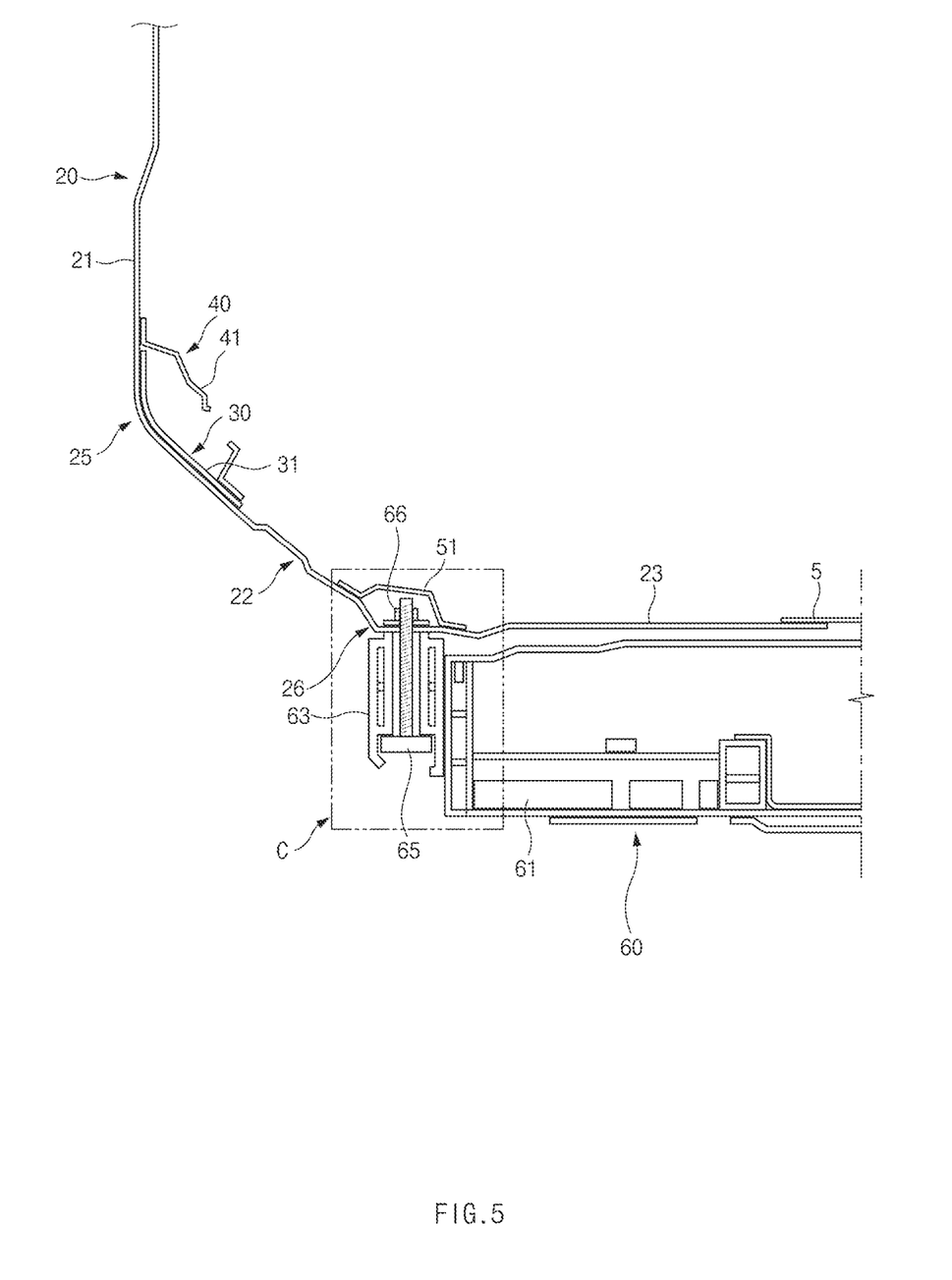
FIG. 5 illustrates an enlarged view of the dash panel structure illustrated in FIG. 4.

Referring to FIGS. 4 and 5, the third reinforcing member 51 may have an inverted U-shaped cross section, and the third reinforcing member 51 may be attached to the top surface of the lower connection portion 26. The third reinforcing member 51 and the lower connection portion 26 of the dash panel 20 may define a closed transverse cross-section, and a cavity may be defined by the third reinforcing member 51 and the lower connection portion 26 of the dash panel 20. As the third reinforcing member 51 and the lower connection portion 26 of the dash panel 20 define the cavity, the stiffness of the lower connection portion 26 of the dash panel 20 may be significantly improved. A front portion of the battery assembly 60 may be connected to the lower connection portion 26 of the dash panel 20 located below the third reinforcing member 51 through fasteners. Specifically, each front mount 63 of the battery assembly 60 may be connected to the lower connection portion 26 of the dash panel 20 located below the third reinforcing member 51 through fasteners so that mounting stiffness of the battery assembly 60 may be improved and the stiffness of the lower connection portion 26 of the dash panel 20 may be improved.

Figure 6:
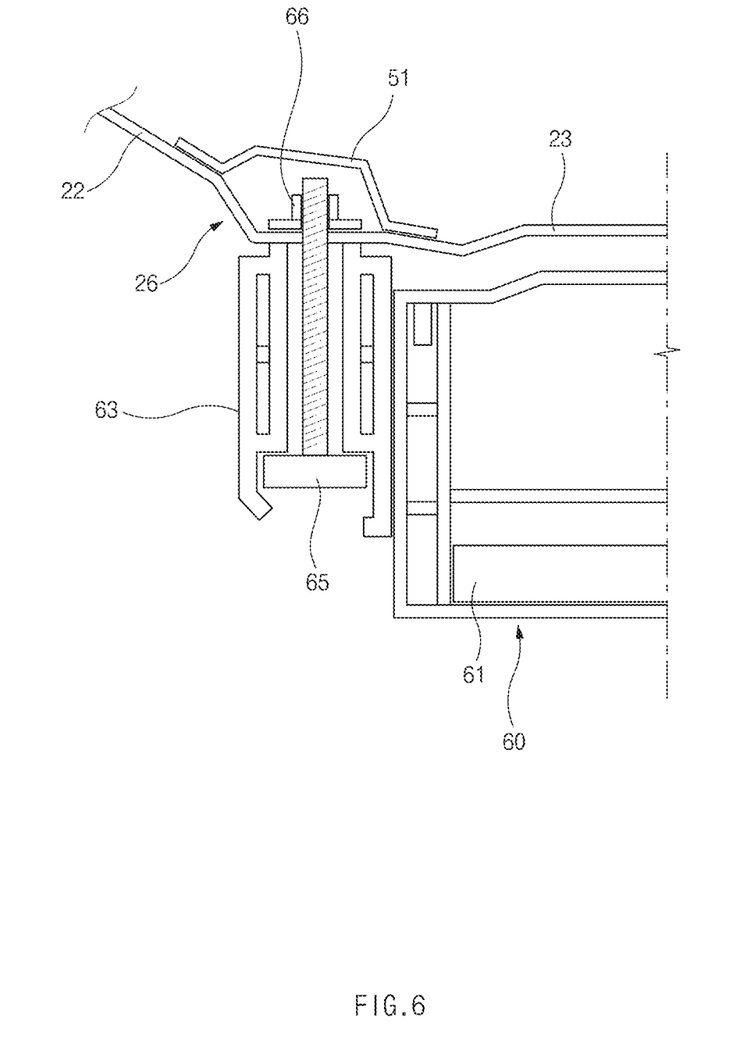
FIG. 6 illustrates an enlarged view of portion C of FIG. 5.

Referring to FIG. 6, a mounting bolt 65 may pass through the front mount 63 of the battery case 61 and the lower connection portion 26 of the dash panel 20, and a nut 66 may be positioned in the cavity defined by the third reinforcing member 51. In particular, the nut 66 may be fixed to the lower connection portion 26. As the mounting bolt 65 is screwed into the nut 66, the front mount 63 of the battery case 61 may be firmly connected to the lower connection portion 26 of the dash panel 20 located below the third reinforcing member 51.

Figure 7:
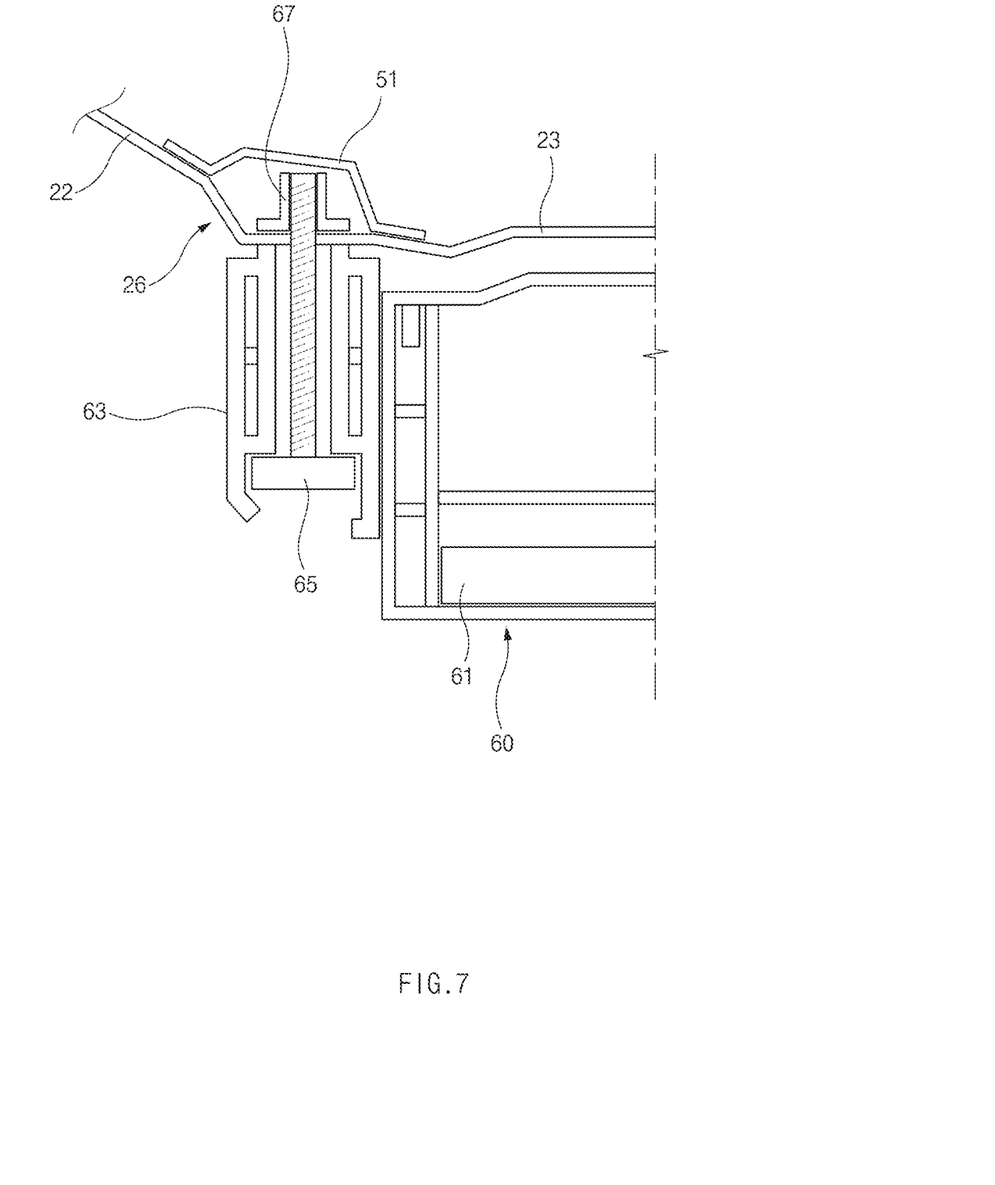
FIG. 7 illustrates a modification of the dash panel structure illustrated in FIG. 6.

Referring to FIG. 7, a pipe nut 67 may be positioned in the cavity defined by the third reinforcing member 51, and the pipe nut 67 may be fixed to the lower connection portion 26. As the mounting bolt 65 passing through the front mount 63 of the battery case 61 and the lower connection portion 26 of the dash panel 20 is screwed into the pipe nut 67, the front mount 63 of the battery case 61 may be firmly connected to the lower connection portion 26 of the dash panel 20 located below the third reinforcing member 51.

As the third reinforcing member 51 is attached to the lower connection portion 26 of the dash panel 20 and the front portion of the battery assembly 60 is firmly connected to the lower connection portion 26 of the dash panel 20, the lower connection portion 26 of the dash panel 20 may be prevented from being deformed or bent in the event of a vehicle impact/collision.

As set forth above, according to exemplary embodiments of the present disclosure, the reinforcing members 30, 40, and 51 may be mounted on the lower portion of the dash panel 20 adjacent to the front subframe, thereby preventing or minimizing the deformation or bending of the dash panel 20 in the event of a vehicle impact/collision. By ensuring an impact safety space between the front subframe 10 and the battery assembly 60, and preventing the front subframe 10 from directly hitting the front portion of the battery assembly 60, the battery assembly 60 may be protected safely. In particular, the reinforcing members 30, 40, and 51 may increase the stiffness of the dash panel 20 and define the load path along the width direction and longitudinal direction of the vehicle body, thereby preventing impact energy from being transferred to the battery assembly 60.

According to exemplary embodiments of the present disclosure, as the front portion of the battery assembly 60 is directly connected through the mounting bolt 65 to the dash panel 20, booming noise from the vehicle body and/or the battery assembly may be prevented in an engine idle condition, and NVH performance and crashworthiness may be improved.

In addition, as the mounting structure for mounting the battery assembly 60 on the vehicle body is not provided in the battery case 61 of the battery assembly 60, but is provided on the outside of the battery case 61, a larger number of battery cells may be mounted in the battery case 61, and thus all electric range (AER) of the electric vehicle may be increased.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A dash panel structure for a vehicle, the dash panel structure comprising:
 a battery assembly located under a floor of the vehicle;
 a front subframe located in front of the battery assembly;
 a dash panel located behind the front subframe and connected to a front of the floor; and
 a first reinforcing member mounted on a lower portion of the dash panel facing the front subframe,
 wherein the first reinforcing member comprises:
  a first transverse extension portion extending in a width direction of the dash panel; and
  a plurality of longitudinal extension portions extending from the first transverse extension portion toward the floor in a longitudinal direction of the vehicle.

2. The dash panel structure according to claim 1, wherein the plurality of longitudinal extension portions comprise:
 a center extension portion extending from a center of the first transverse extension portion in the longitudinal direction of the vehicle;
 a pair of inner extension portions symmetrically disposed on both sides of the center extension portion, respectively; and
 a pair of outer extension portions spaced apart from the pair of inner extension portions toward an exterior of the vehicle, respectively.

3. The dash panel structure according to claim 2, wherein the floor comprises:
 a tunnel extending along a center line of the floor; and
 a pair of floor members symmetrically disposed on both sides of the tunnel, respectively.

4. The dash panel structure according to claim 3, further comprising:
 a pair of side sills mounted on both side edges of the floor, respectively;
 wherein a rear end of each of the pair of inner extension portions is attached to a front end of each of the pair of floor members; and
 wherein a rear end of each of the pair of outer extension portions is attached to a front end of each of the pair of side sills.

5. The dash panel structure according to claim 2, wherein the dash panel comprises:
 a vertical portion;
 an inclined portion obliquely extending from the vertical portion toward a bottom of the vehicle;
 a horizontal portion extending from a rear end of the inclined portion toward the floor;

an upper connection portion connecting a bottom end of the vertical portion and a top end of the inclined portion; and a lower connection portion connecting a bottom end of the inclined portion and a front end of the horizontal portion.

6. The dash panel structure according to claim 5, wherein:
the first transverse extension portion is attached to the upper connection portion, and
the plurality of longitudinal extension portions are attached to the horizontal portion.

7. The dash panel structure according to claim 2, further comprising a second reinforcing member attached to a top surface of the first reinforcing member.

8. The dash panel structure according to claim 7, wherein the second reinforcing member comprises:
a second transverse extension portion extending in the width direction of the dash panel; and
a pair of side extension portions extending from both end portions of the second transverse extension portion, respectively.

9. The dash panel structure according to claim 8, wherein:
the second transverse extension portion is attached to the first transverse extension portion; and
the second transverse extension portion and the first transverse extension portion define a closed transverse cross-section.

10. The dash panel structure according to claim 8, further comprising a pair of front pillars attached to both side edges of the dash panel, respectively, wherein a rear end of each of the pair of side extension portions is attached to the corresponding front pillar.

11. A dash panel structure for a vehicle, the dash panel structure comprising:
a battery assembly located under a floor of the vehicle;
a front subframe located in front of the battery assembly;
a dash panel located behind the front subframe and connected to a front of the floor, wherein the dash panel comprises:
  a vertical portion;
  an inclined portion obliquely extending from the vertical portion toward a bottom of the vehicle;
  a horizontal portion extending from a rear end of the inclined portion toward the floor;
  an upper connection portion connecting a bottom end of the vertical portion and a top end of the inclined portion; and
  a lower connection portion connecting a bottom end of the inclined portion and a front end of the horizontal portion;
a first reinforcing member mounted on a lower portion of the dash panel facing the front subframe, wherein the first reinforcing member comprises a first transverse extension portion extending in a width direction of the dash panel and a plurality of longitudinal extension portions extending from the first transverse extension portion toward the floor, wherein the plurality of longitudinal extension portions comprise:
  a center extension portion extending from a center of the first transverse extension portion in a longitudinal direction of the vehicle;
  a pair of inner extension portions symmetrically disposed on both sides of the center extension portion, respectively; and
  a pair of outer extension portions spaced apart from the pair of inner extension portions toward an exterior of the vehicle, respectively;
a second reinforcing member attached to a top surface of the first reinforcing member; and
a pair of third reinforcing members attached to a top surface of the lower connection portion.

12. The dash panel structure according to claim 11, wherein each of the pair of third reinforcing members connects each of the pair of inner extension portions and the center extension portion.

13. The dash panel structure according to claim 12, wherein the pair of third reinforcing members and the lower connection portion define a cavity.

14. The dash panel structure according to claim 13, wherein a front portion of the battery assembly is connected to the lower connection portion located below the third reinforcing member through a mounting bolt.

15. The dash panel structure according to claim 14, wherein:
a nut is positioned in the cavity; and
the front portion of the battery assembly is connected to the lower connection portion by the mounting bolt screwed into the nut.

16. The dash panel structure according to claim 14, wherein:
a pipe nut is positioned in the cavity; and
the front portion of the battery assembly is connected to the lower connection portion by the mounting bolt screwed into the pipe nut.

17. A method of forming a dash panel structure for a vehicle, the method comprising:
disposing a battery assembly under a floor of the vehicle;
disposing a front subframe in front of the battery assembly;
disposing a dash panel behind the front subframe and connected to a front of the floor; and
mounting a first reinforcing member on a lower portion of the dash panel facing the front subframe, wherein the first reinforcing member comprises:
  a first transverse extension portion extending in a width direction of the dash panel; and
  a plurality of longitudinal extension portions extending from the first transverse extension portion toward the floor.

18. The method according to claim 17, wherein the plurality of longitudinal extension portions comprise:
a center extension portion extending from a center of the first transverse extension portion in a longitudinal direction of the vehicle;
a pair of inner extension portions symmetrically disposed on both sides of the center extension portion, respectively; and
a pair of outer extension portions spaced apart from the pair of inner extension portions toward an exterior of the vehicle, respectively.

19. The method according to claim 18, further comprising:
attaching a second reinforcing member to a top surface of the first reinforcing member; and
attaching a pair of third reinforcing members to a top surface of a lower connection portion of the dash panel.

* * * * *